United States Patent [19]

Magee et al.

[11] Patent Number: 4,890,917

[45] Date of Patent: Jan. 2, 1990

[54] SMALL ANGLE GENERATING APPARATUS

[75] Inventors: Robert J. Magee, Concord; Jian P. Marchi, Littleton, both of Mass.

[73] Assignee: The United States of America as represented by the Secretary of the Navy, Washington, D.C.

[21] Appl. No.: 215,199

[22] Filed: Jul. 5, 1988

[51] Int. Cl.$^4$ .............................................. G01B 11/26
[52] U.S. Cl. .................................................... 356/138
[58] Field of Search ......................................... 356/138

[56] References Cited

U.S. PATENT DOCUMENTS 3,904,295  9/1975  Hock et al. ........................... 356/398
3,958,884  5/1976  Smith ................................... 356/360

Primary Examiner—Léon Scott, Jr.
Attorney, Agent, or Firm—Arthur A. McGill; Prithvi C. Lall; Michael J. McGowan

[57] ABSTRACT

A small angle generating apparatus is described for deviating optical beams by accurately measurable small angles to calibrate autocollimators or the like. It includes a double mirror combination which is mounted on an elongated mechanical beam which is rotatable about a pivot at one end of the beam by means of a micrometer coupled at the opposite end thereof. Rotation of the double mirror combination deviates a beam of light from a test autocollimator from its original position either horizontally or vertically through a small angle which is linearly proportional to the angular rotation of the mechanical beam.

8 Claims, 1 Drawing Sheet

SMALL ANGLE GENERATING APPARATUS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

Subject invention is related to calibration of optical systems such as autocollimators and more particularly to a small angle generating system for deviating or deflecting light beams.

(2) Description of the Prior Art

The angular deflections of light beams have been accomplished in the past by converting large mechanical movements into corresponding small movements of reflecting or refracting surfaces in order to obtain a high optical advantage. However, such methods have been expensive in order to obtain accurate mechanical movements which are repeatable. Furthermore, any nonlinearity in the mechanical movements makes the calibration of the devices difficult. One novel technique to accomplish this is described and claimed in our copending application Ser. No. 07/215,200 filed July 5, 1988. That technique makes use of an optical wedge of small apex angle $\alpha$ which is rotated to produce a small deviation of a collimated optical beam. However, in case of a rotating optical wedge there are spurious images due to back and forth reflections from the faces of the wedge which give rise to noisy signals. Furthermore, an extended spectral range for a small angle generating system will require several optical wedges with transmission for each wedge in a particular portion of the spectrum. Additionally, there is chromatic dispersion and variable attenuation with wavelength of the wedge. It is thus desirable to have a small angle generating system which is free of the above-mentioned disadvantages.

SUMMARY OF THE INVENTION

A small angle generating system according to the teachings of subject invention includes a double mirror arrangement instead of using an optical wedge. The double mirror combination is rotated on a flexural pivot. Besides, the two mirrors of the combination can be rotated about an axes through their respective centers. Besides, the double mirror arrangement can be used to induce either vertical deviation or horizontal deviation of the optical beam and thus increase its versatility.

An object of subject invention is to have a small angle generating system which does not produce spurious images at the optical surfaces due to back and forth reflections.

Another object of subject invention is to have a small angle generating system which has a wide spectral range from ultraviolet to infrared regions.

Still another object of subject invention is to have a small angle generating system which has no spectral dispersion of an optical beam passing therethrough.

Further object of subject invention is to have a small angle generating system which has no variable attenuation of the optical beam.

Still another object of the invention is to have a small angle generating system wherein the input mirror rotates about it own center.

An additional object of subject invention is to have a small angle generating system wherein the double mirror assembly can be removed, turned 90 degrees and remounted for generating angular deviations in zenith rather than azimuth and thus making the angle generating usable along two axes.

Other objects, advantages and novel features of the invention may become apparent from the following detailed description of the invention when considered in conjunction with the accompanying drawings wherein:

DESCRIPTION OF THE PREFERRED EMBODIMENT

Figure 1:
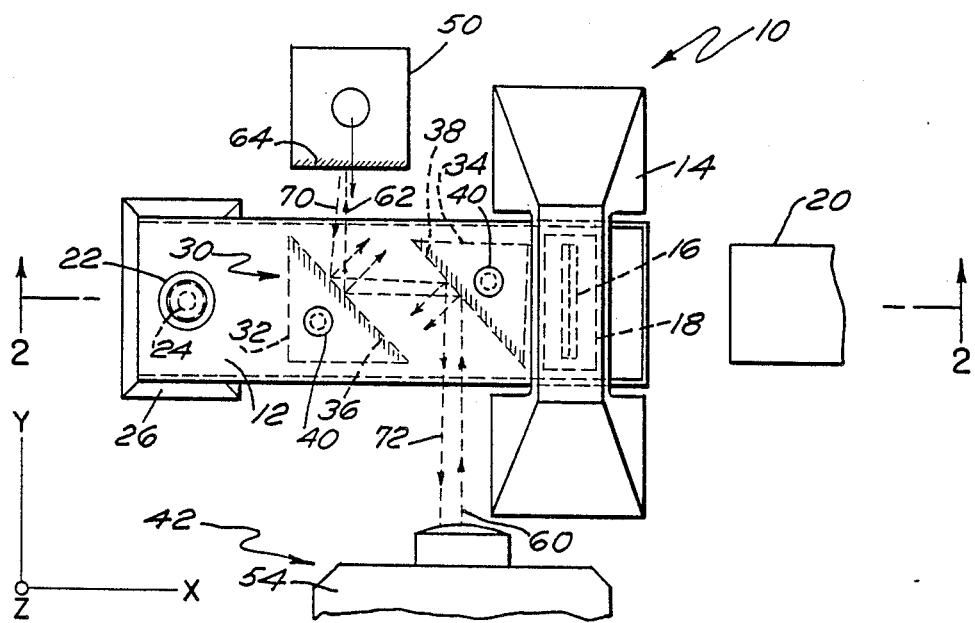
FIG. 1 is a top view of the small angle generating system built according to the teachings of subject invention.
Figure 2:
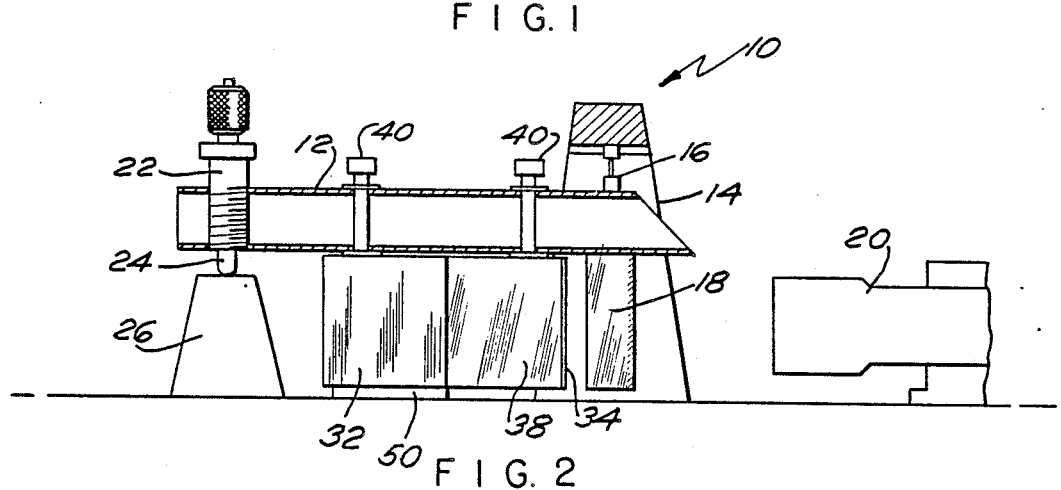
FIG. 2 is a cross-sectional view taken along line 2—2 of FIG. 1.

Referring now to the drawings wherein like parts correspond to the like numbers throughout, FIG. 1 is a top view of the small angle generator 10 using a double mirror combination. Here X- & Y-axes are in the plane of the paper and Z-axis is pointing perpendicularly out of the plane of the paper. The small angle generator includes a rigid, optically stiff and elongated mechanical beam 12 having its one end mounted on support 14 using a flexural pivot 16. This enables beam 12 to rotate either counterclockwise or clockwise about a horizontal axis through pivot 16. A flat mirror 18 is mounted near the flexural pivot which forms a part of auxiliary autocollimator 20 for determining accurately the angular position of mechanical beam 12. The rotation of beam 12 is accomplished by using a micrometer 22 engaged at the other end of the elongated beam 12. End 24 of the micrometer 22 rests on support 26 as shown in FIGS. 1 and 2. Additionally, a double mirror combination 30 including prism-like mirrors 32 and 34 are mounted on mechanical beam 12 with the respective reflecting surfaces 36 and 38 positioned as shown in FIG. 1. Mirror 34 is the input mirror which is rotatable about a horizontal axis through center point 40 of the mirror. Dynamic autocollimator (DYNAC) 42 is used to test its calibration using small angular deviations generated in its line of sight by the device of subject invention. DYNAC 42 includes a rotatably mounted reflecting cube 50 and a source of light and associated optical hardware 54 to obtain a collimated light beam 60. Beam 60 gets reflected at reflecting surfaces 38, 36, 64, 36 and 38 respectively to trace paths indicated by numerals 62, 70 and 72 as shown in FIG. 1. Mirrors 32 and 34 are rotatable about horizontal axes through their respective centers so as to change their orientation by misalignment from the position of parallelism of 36 and 38 to cover a wide range of small angular deviations of the collimated light beam 60. Rotation of beam 12 is achieved by the movement of micrometer 22 with its lower end 24 resting on support 26. The micrometer is coupled to beam 12 and causes it to move either counterclockwise or clockwise. Mirrors 18, 32 and 34 rotate with the rotation of beam 12. The angle $\phi$ through which beam 12 is rotated is measured by using mirror 18 and auxiliary autocollimator 20 whose line of sight is deviated because of the rotation mirror 18 or that of beam 12. When mechanical beam is in horizontal position, collimated beam 60 is made to experience reflections at reflecting surfaces 38, 36, 64, 36 and 38 with a preset misalignment from their parallel position for surfaces 36 and 38. Light beam 72 returning to the DYNAC 42 deviates by an angle $\beta$ which is measured by the DYNAC 42. If mirrors 32 and 34 have their reflecting surfaces 36 and 38 exactly parallel, the collimated beam 60 will not be deviated at all despite the rotation of the reflecting cube 50. The beam 12 is made to rotate counterclockwise (downward mostly vertical) which in turn causes mirrors 18, 32 and 34 rotate by the same amount in the vertically downward direction. Besides the same (vertically downward) motion of beam 12, mirror 18, 32 and 34, there is a slight horizontal movement of the collimated beams 60 and 72 if the reflecting surfaces 36 and 38 are slightly misaligned from parallel orientation. If the angular distance traveled by beam 12, mirror 18 and mirrors 32 and 34 is $\phi$, and the horizontal leftward deflection is $\beta$, the vertical motion of the collimated beam 60 is given by $\beta \sin \phi$. Consequently, the optical advantage which is defined as the ratio of the horizontal angular distance traveled by the light beam and the angular distance $\phi$ through which mirror combination 30 has moved is given by $$\frac{\beta \sin \phi}{\phi}$$

Figure 3:
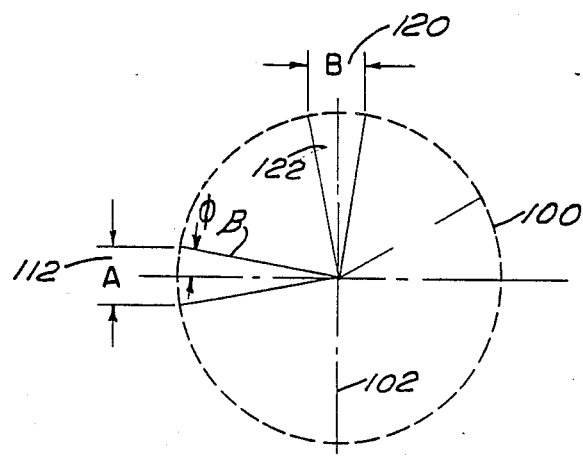
FIG. 3 is a graphical representation of the deviations caused in the either azimuth or zenith.

Thus, the line sight of DYNAC 42 experiences a very small angular deviation resulting from a relatively large angular distance through which the mechanical beam has rotated. The deviations caused in the direction of the collimated beam 60 due to the rotation of beam 12 are the horizontal direction. This means that we are in position A of the circle 100 which has radius $\beta$ equal to the vertical deviation of the collimated beam 60. This is shown in FIG. 3. An azimuth motion can be obtained by rotating the entire double mirror assembly 30 in its original configuration through 90 degrees about an axis parallel to the DYNAC 42 collimated beam axis and centered on mirror 34. In that case, we would be at area B on the locus circle 100 and motion would be zenith. This increases the versatility of the small angle generator by obtaining small angular deviations along two orthogonal axes.

In operation, mechanical beam 12 is placed in horizontal position by means of micrometer 22 and the double mirror combination is adjusted so that reflecting surfaces 36 and 38 are slightly misaligned from their being parallel to one another. The deviation of the collimated beam 60 is measured and found to be angle $\beta$. The beam 12 is rotated through $\phi$ in the counterclockwise direction and the horizontal component to the right is then measured which gives the optical advantage to be $$\frac{\beta \sin \phi}{\phi}$$

By rotating mirrors 32 and 34 through 90 degrees, we can generate small angular motions of the collimated beam to find the vertical component.

Many modifications and variations of the present disclosed invention are possible in the light of above teachings. As an example, a rhombic prism can be used in lieu of the two mirror assembly. Besides, the rotational motion of the mechanical beam can be measured using other techniques. It is therefore understood that within the scope of the appended claims, the invention may be practiced otherwise than as specifically described.

What is claimed is:

1. A small angle generator for deviating an optical beam through accurately measurable small angles to calibrate autocollimators, said small angle generator comprises:
    an optically rigid elongated mechanical beam having a first end and a second end;
    a flexural pivot connected to said first end of said elongated mechanical beam;
    a rigid support adjacent said first end of said elongated mechanical beam and said flexural pivot attached to said rigid support so as to enable said mechanical beam to rotate about a horizontal axis through said flexural pivot;
    means for rotating said elongated mechanical beam about said horizontal axis;
    means for measuring rotational angle of said mechanical beam after rotation thereof;
    a double mirror combination mounted on said elongated mechanical beam for deviating a beam of light falling thereon; and
    an autocollimater under test for generating said beam of light as a line of sight, said beam of light arranged to pass through said double mirror combination to cause a reduced angular deviation thereof having a linear relationship to the annular rotation of said elongated mechanical beam whereby said deviation of said beam of light of said autocollimator under test is measured in terms of calibration of said beam of light using an auxiliary autocollimator.

2. The small angle generator of claim 1 which further includes means for measuring accurately the angle of rotation of said elongated mechanical beam.

3. The small angle generator of claim 2, wherein said means for accurately measuring the rotation angle of said elongated mechanical beam includes a flat mirror rigidly attached to said elongated mechanical beam experiencing identical angular rotation to that of said elongated mechanical beam.

4. The small angle generator of claim 3 wherein said double mirror combination mounted on said elongated beam provides independent rotation of the mirrors of said double mirror combination so as to misalign respective reflecting surfaces from the parallel position of said reflecting surfaces.

5. The small angle generator of claim 4 wherein said double mirror combination provides means for rotating the mirrors of said double mirror combination through 90 degrees to deviate the optical beam of said collimator under test along a direction perpendicular to the direction of deflection of the beam of light of said collimator under test before the 90 degrees rotation of the double mirror combination.

6. A method of generating accurately small angles for deviating a beam of light of a autocollimator under test using a rotatably mounted elongated mechanical beam having a flat mirror of an auxiliary autocollimator and a double mirror combination with each mirror thereof having a reflecting surface with the two reflecting surfaces almost parallel to one another, said method including the steps of:

rotating said elongated mechanical beam;

measuring accurately angular rotation of said elongated beam;

misaligning the reflecting surfaces of the two mirrors of said double mirror combination from the parallel position thereof; and passing said beam of light of said autocollimator under test to cause a small angular deviation of said optical beam.

7. The method of claim 6 which further includes the step of rotating the two mirrors of said double mirror combination through 90 degrees so as to deviate the optical beam of said test collimator along a perpendicular direction from the deviation thereof in claim 6.

8. The small angle generator of claim 1 wherein said elongated mechanical beam is connected to a micrometer-support combination for rotating said elongated mechanical beam about said flexural pivot.

* * * * *